UNITED STATES PATENT OFFICE.

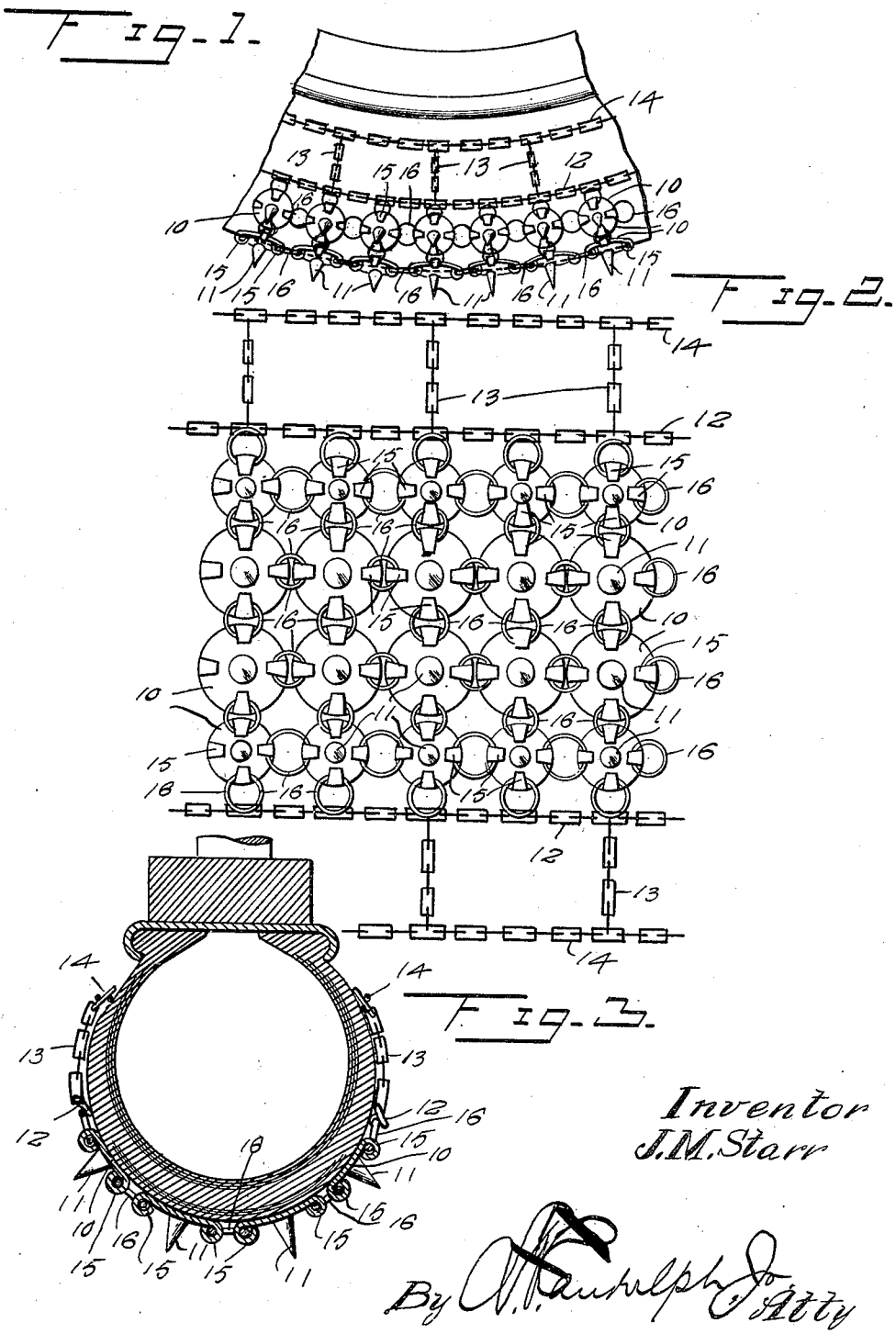

JENNIE M. STARR, OF MONTROSE, SOUTH DAKOTA.

ANTISKID-CHAIN.

1,392,881.            Specification of Letters Patent.          Patented Oct. 4, 1921.

Application filed February 14, 1920. Serial No. 358,773.

*To all whom it may concern:*

Be it known that I, JENNIE M. STARR, a citizen of the United States, residing at Montrose, in the county of McCook and State of South Dakota, have invented certain new and useful Improvements in Antiskid-Chains; and I do hereby declare the following to be a full, clear, and exact description of the invention, such as will enable others skilled in the art to which it appertains to make and use the same.

An object of the invention is to provide an anti-skid chain which is particularly adapted for use in traversing roads or other surfaces covered with ice and snow with a view to giving increased and effective traction power to the drive wheel but also adapted for use on loose road surfaces such as those which are sandy or muddy, the construction of the same being such as to avoid cutting or chafing the tire and at the same time to minimize the accumulation of foreign matter which may interfere with the proper operation of the structure, and with these objects in view the invention consists in a construction and combination of parts of which the preferred embodiment is shown in the accompanying drawing, wherein:

Figure 1 is a side view of a portion of a wheel upon which is arranged an anti-skid chain or armor constructed in accordance with the invention.

Fig. 2 is a plan view of the same.

Fig. 3 is a detail sectional view taken transversely through a series of the peg carrying plates.

The device consists essentially of a series of armor plates 10 which may as shown be provided with more or less tapered pegs 11, although obviously the shape of the latter and in fact the use thereof will depend upon the character of the road which is to be traversed or the obstacles which are to be or may be encountered and preferably these plates are of graduated sizes, those of larger area being arranged at or near the tread portion of the wheel or the center of the tread portion while the sizes may be reduced toward the sides of the tire, marginal chain 12 being arranged parallel with the series of plates and connected by tie chains 13 with the fastening or anchoring chains 14 of which the extremities may be secured together in any preferred or approved manner.

In order that the plates may have inner or bearing surfaces for contact with the tire which will not unnecessarily rub or injure the same, the connecting means between the plates consist of outwardly directed hooks or folds 15 turned down exteriorly of the plate to approximate the surfaces thereof, and rings 16 which are adapted to be snapped under the extremities of the hooks or ears, the rings being of such dimensions as to hold the adjacent portions of the plates in close relation to avoid the provision of large openings for the accumulation of snow or ice or mud or other foreign matters.

The plates are adapted to conform to the curvature of the tire and the pegs when employed as shown in the drawing are located preferably at the centers thereof, so as to insure a firm length of the surface traversed by the wheel in connection with which the device is used, and it will be obvious that by reason of the indicated connection between the adjacent plates or units of the device and between the marginal members of the armor and the marginal chain, the replacement of an injured unit is facilitated.

Moreover the indicated means of connection between the units of the armor permits of a sufficient flexibility of the same to follow the movements of the surface of the tire while remaining in closed relation therewith, and under conditions which minimize the transverse or longitudinal sliding movement and hence the unnecessary wearing of the surface of the tire due to frictional contact.

What is claimed is:

1. An anti-skid covering comprising disks, rings flexibly connecting said disks, said rings being arranged in circumferential and in transverse series, the rings of the circumferential series being substantially the same in size, and the rings in transverse series varying in size.

2. An anti-skid covering comprising disks increasing in diameter from the edges of the covering toward the center to facilitate snug fit against the exterior of a tire, and means flexibly connecting the disks consisting of rings in circumferential and transverse series, the rings being of substantially the same size in the circumferential series and varying in size in transverse series.

3. An anti-skid covering comprising disks increasing in diameter from the edges of the covering toward the center to facilitate snug fit against the exterior of a tire, and means flexibly connecting the disks consisting of rings in circumferential and transverse series, the rings being of substantially the same size in the circumferential series and varying in size in transverse series, said disks having lugs integral therewith mounting the rings, and chains connected to the outermost circumferential rows of rings.

In testimony whereof I affix my signature in presence of two witnesses.

JENNIE M. STARR.

Witnesses:
A. C. KINGSBERY,
JOHN S. STARR.